US012253369B2

(12) United States Patent
Schreier et al.

(10) Patent No.: US 12,253,369 B2
(45) Date of Patent: Mar. 18, 2025

(54) MULTI-STOP ROUTE SELECTION SYSTEM (71) Applicant: Allstate Insurance Company, Northbrook, IL (US)

(72) Inventors: Elizabeth Schreier, Glenview, IL (US); Jamie Elizabeth Grahn, Lakemoor, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/229,896

(22) Filed: Aug. 3, 2023

(65) Prior Publication Data
US 2023/0384102 A1 Nov. 30, 2023

Related U.S. Application Data (63) Continuation of application No. 17/016,923, filed on Sep. 10, 2020, now Pat. No. 11,754,406, which is a
(Continued)

(51) Int. Cl.
*G01C 21/34* (2006.01)
*G01C 21/36* (2006.01)
(Continued)

(52) U.S. Cl.
CPC ....... *G01C 21/343* (2013.01); *G01C 21/3415* (2013.01); *G01C 21/3423* (2013.01);
(Continued)

(58) Field of Classification Search
CPC .............. G01C 21/343; G01C 21/3415; G01C 21/3423; G01C 21/3461; G01C 21/3484;
(Continued)

(56) References Cited

U.S. PATENT DOCUMENTS 5,790,974 A  8/1998 Tognazzini
7,486,201 B2  2/2009 Kelly et al.
(Continued)

OTHER PUBLICATIONS

Dec. 15, 2020—(CA) Notice of Allowance—Application No. 3,044,001 (006591.02129), 1 Page.
(Continued)

*Primary Examiner* — Tyler D Paige
(74) *Attorney, Agent, or Firm* — Polsinelli PC (57) ABSTRACT A multi-stop route selection system may include a telematics device associated with a vehicle having one or more sensors arranged therein, a mobile device, and a server computer. The server computer may receive driving data of a driver of the vehicle and a vehicle location from the telematics device, determine one or more driving behaviors of the driver based on the driving data, receive data regarding a calendar of the driver from the mobile device, identify a plurality of appointments in the calendar, determine a route comprising multiple destinations for the driver based on the vehicle location, the one or more driving behaviors, and the plurality of appointments, transmit the route to the mobile device, receive a request to add a new destination to the route from the mobile device, generate a modified route comprising the new destination, and transmit the modified route for the driver to the mobile device.

17 Claims, 4 Drawing Sheets

Related U.S. Application Data continuation of application No. 16/004,512, filed on Jun. 11, 2018, now Pat. No. 10,775,181, which is a continuation of application No. 15/353,252, filed on Nov. 16, 2016, now Pat. No. 10,024,671.

(51) Int. Cl.

| | | |
|---|---|---|
| *H04L 67/12* | (2022.01) | |
| *H04L 67/306* | (2022.01) | |
| *H04W 4/024* | (2018.01) | |
| *H04W 4/029* | (2018.01) | |
| *H04W 4/40* | (2018.01) | |
| *H04W 4/44* | (2018.01) | |
| *H04W 88/02* | (2009.01) | |

(52) U.S. Cl.
CPC ..... *G01C 21/3461* (2013.01); *G01C 21/3484* (2013.01); *G01C 21/362* (2013.01); *G01C 21/3655* (2013.01); *G01C 21/3661* (2013.01); *G01C 21/3679* (2013.01); *G01C 21/3691* (2013.01); *H04L 67/12* (2013.01); *H04L 67/306* (2013.01); *H04W 4/024* (2018.02); *H04W 4/029* (2018.02); *H04W 4/40* (2018.02); *H04W 4/44* (2018.02); *H04W 88/02* (2013.01)

(58) Field of Classification Search
CPC .............. G01C 21/362; G01C 21/3655; G01C 21/3661; G01C 21/3679; G01C 21/3691; H04L 67/12; H04L 67/306; H04W 4/024; H04W 4/029; H04W 4/40; H04W 4/44; H04W 88/02
USPC ......................................................... 701/412
See application file for complete search history.

(56) References Cited

U.S. PATENT DOCUMENTS

| | | | |
|---|---|---|---|
| 8,175,802 | B2 | 5/2012 | Forstall et al. |
| 8,521,407 | B2 | 8/2013 | Haynes, III et al. |
| 8,700,249 | B1 | 4/2014 | Carrithers |
| 8,781,716 | B1 | 7/2014 | Wenneman et al. |
| 8,793,065 | B2 | 7/2014 | Seltzer et al. |
| 8,949,028 | B1 | 2/2015 | Klampfl et al. |
| 9,127,946 | B1 | 9/2015 | Menon et al. |
| 9,317,813 | B2 | 4/2016 | McGavran et al. |
| 10,024,671 | B2* | 7/2018 | Schreier ............ G01C 21/3461 |
| 10,775,181 | B2* | 9/2020 | Schreier ................ H04W 4/024 |
| 11,754,406 | B2* | 9/2023 | Schreier .................. H04L 67/12 701/412 |
| 2002/0120728 | A1 | 8/2002 | Braatz et al. |
| 2006/0059024 | A1 | 3/2006 | Bailey et al. |
| 2007/0275700 | A1 | 11/2007 | Agrawal et al. |
| 2007/0277113 | A1 | 11/2007 | Agrawal et al. |
| 2008/0046176 | A1 | 2/2008 | Jurgens |
| 2008/0086455 | A1* | 4/2008 | Meisels .................. G01C 21/26 |
| 2008/0103686 | A1 | 5/2008 | Alberth et al. |
| 2008/0167937 | A1 | 7/2008 | Coughlin et al. |
| 2008/0300778 | A1 | 12/2008 | Kuznetsov |
| 2008/0319652 | A1 | 12/2008 | Moshfeghi |
| 2009/0005082 | A1 | 1/2009 | Forstall et al. |
| 2009/0063045 | A1 | 3/2009 | Figueroa et al. |
| 2010/0228473 | A1 | 9/2010 | Ranford |
| 2011/0098915 | A1 | 4/2011 | Disatnik et al. |
| 2012/0010805 | A1* | 1/2012 | Wilkerson ............ G06Q 10/109 701/538 |
| 2012/0316763 | A1 | 12/2012 | Haynes, III et al. |
| 2013/0031567 | A1 | 1/2013 | Nano et al. |
| 2013/0218445 | A1 | 8/2013 | Basir |
| 2014/0045481 | A1 | 2/2014 | Fraley |
| 2014/0046585 | A1* | 2/2014 | Morris, IV ........... G06Q 10/047 701/400 |
| 2014/0047347 | A1* | 2/2014 | Mohn .................... G06F 3/0484 715/738 |
| 2014/0278070 | A1 | 9/2014 | McGavran et al. |
| 2014/0278086 | A1 | 9/2014 | San Filippo et al. |
| 2014/0278206 | A1 | 9/2014 | Girod et al. |
| 2014/0330505 | A1 | 11/2014 | Wenneman et al. |
| 2014/0365107 | A1 | 12/2014 | Dutta et al. |
| 2015/0019266 | A1 | 1/2015 | Stempora |
| 2015/0081169 | A1 | 3/2015 | Pisz |
| 2015/0095086 | A1* | 4/2015 | Gopinath ........... G06Q 10/1093 705/7.18 |
| 2015/0121216 | A1 | 4/2015 | Brown et al. |
| 2015/0219466 | A1 | 8/2015 | Shah et al. |
| 2015/0248651 | A1 | 9/2015 | Akutagawa et al. |
| 2016/0097646 | A1 | 4/2016 | Alonso et al. |
| 2016/0114805 | A1 | 4/2016 | Yang et al. |
| 2016/0156773 | A1 | 6/2016 | Chanda |
| 2016/0216130 | A1 | 7/2016 | Abramson et al. |
| 2016/0251016 | A1 | 9/2016 | Pallett et al. |
| 2017/0030726 | A1 | 2/2017 | French et al. |
| 2018/0003512 | A1* | 1/2018 | Lynch ................. G01C 21/3811 |
| 2018/0060827 | A1* | 3/2018 | Abbas .................... G08G 1/005 |
| 2018/0135989 | A1* | 5/2018 | Schreier ............. G01C 21/3655 |
| 2018/0143635 | A1* | 5/2018 | Zijderveld ............. A61B 5/165 |
| 2018/0266834 | A1* | 9/2018 | Cronin ................... B60W 50/14 |

OTHER PUBLICATIONS

Jul. 13, 2020—(CA) Office Action—Application No. 3,044,001 (006591.02129), 5 Pages.

Buczkowski A., "TomTom's iPhone App Update to Version 1.8 with Multi-Stop Routes," Geoawesomeness, Jun. 28, 2011, Downloaded from iTunes on Jun. 30, 2016, 9 pages.

"CoPilot On-Board GPS Navigation Optimized for the iPhone," ALK Technologies, Downloaded on Jun. 30, 2016, 8 Pages.

"Get the Best Route, Every Day, with Real-time help from Other Drivers," Waze Mobile, Dowloaded on Jun. 30, 2016, 6 pages.

"How does Waze Work," Waze Help, Downloaded on Jun. 30, 2016, 4 Pages.

"InRoute—Intelligent Route and Road Trip Planner," YouTube, Published on Sep. 23, 2014, Downloaded on Jun. 30, 2016, 3 Pages.

"InRoute (for iPhone) Review and Ratings," PCMag.com, Jan. 14, 2016, Downloaded on Jun. 30, 2016, 12 Pages.

"InRoute Route Planner, GPS Navigation & Severe Weather Alerts," Carob Apps, LLC, Downloaded from iTunes on Jun. 30, 2016, 4 Pages.

International Preliminary Report on Patentability for International Application No. PCT/US2017/057313, mailed May 31, 2019, 9 Pages.

International Search Report and Written Opinion for International Application No. PCT/US2017/051304, mailed Oct. 5, 2017, 8 pages.

International Search Report and Written Opinion for International Application No. PCT/US2017/057313, mailed Nov. 17, 2017, 11 Pages.

"Route4Me Route Planner," Route4Me Inc, Dowloaded from iTunes Jun. 30, 2016, 4 Pages.

Sorrel C., "InRoute Map App Includes Weather, Wind, Curviness and More," Cult of Mac, ITunes, Mar. 13, 2014, Downloaded on Jun. 30, 2016, 20 Pages.

"Waze—GPS Navigation, Maps & Social Traffic," Waze Inc, Downloaded from iTunes on Jun. 30, 2016, 4 Pages.

"Waze—What's New in Version 3.2," Waze Inc, Youtube.com, Published on Jun. 20, 2012, Downloaded from YouTube on Jun. 30, 2016, 4 Pages.

* cited by examiner

MULTI-STOP ROUTE SELECTION SYSTEM

CROSS-REFERENCE TO RELATED APPLICATIONS

The present application is a continuation of U.S. patent application Ser. No. 17/016,923 filed Sep. 10, 2020, which is a continuation of U.S. patent application Ser. No. 16/004,512 filed Jun. 11, 2018, which is a continuation of U.S. patent application Ser. No. 15/353,252, filed Nov. 16, 2016, issued as U.S. Pat. No. 10,024,671 on Jul. 17, 2018. Each of these applications is incorporated by reference in its entirety herein.

BACKGROUND

Mobile devices, such as smartphones, tablet computers, and other types of mobile computing devices, are becoming increasingly popular for a variety of purposes. In some cases, mobile devices, such as smartphones, make people's lives easier by allowing them to connect with various applications and complete different tasks quickly. For example, users may employ mobile devices in personal and business settings to manage their work, connect with others, manage finances, participate in social media, play games, navigate to various destinations, and the like.

Users may utilize their mobile devices while at home, at work, at the grocery store, or even while commuting. That is, it may become more prevalent for users to employ their mobile devices while driving in their vehicles. Users may operate their mobile devices while driving to and from several destinations. For example, a driver may have a busy schedule at work and may use his or her phone to prepare for his or her work day and/or navigate to one or more locations for various meetings. In another example, a driver may have various errands to do and may use his or her mobile device to navigate to locations for each errand using his or her mobile phone.

Ultimately, users may depend on a variety of mobile applications (e.g., applications designed specifically for use with specially designed mobile device operating systems) while driving in order to navigate directions, listen to music, communicate with others, access their calendars before a busy work day, or for other varying services provided by the mobile applications. Unfortunately, many of the mobile applications require users to enter a relatively large amount of user information, and the mobile applications might not be able to learn patterns from the user's behaviors or environment in order to provide accurate and intuitive services that are customized to each user.

In some cases, it may be beneficial for users to have access to a customized service that provides navigation for users while driving and enhances each user's driving experience with their mobile devices. As such, new systems, methods, and devices may be desired to leverage the capabilities of mobile devices in providing navigation to users in an improved and efficient manner.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by describing computerized methods, systems, devices, and apparatuses for a multi-stop route selection system that integrates calendar information, telematics information, driving behaviors, driving risks, and/or preferences to provide drivers with customized and intuitive navigation. For example, the system may analyze a user's calendar, habits, driving behaviors, and the like to determine appointments and appropriate stops for the user while driving. The user may interface with the route selection system by utilizing a route selection mobile application on the user's mobile device. In another example, the route selection system may analyze the risk of various routes to select and optimize a route for a driver based on safety and efficiency. In some embodiments, the route selection system may communicate with application program interfaces, data analytics platforms, and/or third-party platforms that provide one or more of weather information, traffic information, road safety information, risk information, or the like.

The disclosure describes a system comprising a telematics device associated with a vehicle having one or more sensors arranged therein, a mobile device associated with a driver of the vehicle, and a server computer comprising hardware including a processor and memory. The server computer may be configured to receive, from the one or more sensors and via the telematics device, driving data of a driver of the vehicle and a vehicle location, determine one or more driving behaviors of the driver based on the driving data, receive, from the mobile device, data regarding a calendar of the driver, identify a plurality of appointments in the calendar of the driver, determine a route comprising multiple destinations for the driver based on the vehicle location, the one or more driving behaviors of the driver, and the plurality of appointments in the calendar of the driver, transmit the route for the driver to the mobile device, receive, from the mobile device, a request to add a new destination to the route for the driver, modify the route to include the new destination, resulting in a modified route comprising the new destination, and transmit the modified route for the driver to the mobile device.

The disclosure also describes an apparatus comprising at least one processor, a network interface configured to communicate, via a network, with a telematics device and a first computing device, and a memory storing computer-readable instructions that, when executed by the at least one processor, cause the apparatus to receive, from the telematics device, driving data of a driver of a vehicle and a vehicle location, determine one or more driving behaviors of the driver based on the driving data, receive, from the first computing device, data regarding a calendar of the driver, identify a plurality of appointments in the calendar of the driver, determine a route comprising multiple destinations for the driver based on the vehicle location, the one or more driving behaviors of the driver, and the plurality of appointments in the calendar of the driver, transmit the route for the driver to the first computing device, receive, from the first computing device, a request to add a new destination to the route for the driver, modify the route to include the new destination, resulting in a modified route comprising the new destination, and transmit the modified route for the driver to the first computing device.

In addition, aspects of this disclosure provide a method that includes receiving, from a telematics device associated with a vehicle having one or more sensors arranged therein, driving data of a driver of the vehicle and a vehicle location, determining, by one or more computing devices, one or more driving behaviors of the driver based on the driving data, receiving, from a mobile device associated with the driver of the vehicle, data regarding a calendar of the driver, identifying, by the one or more computing devices, a plurality of appointments in the calendar of the driver, determining, by the one or more computing devices, a route comprising multiple destinations for the driver based on the vehicle location, the one or more driving behaviors of the driver, and the plurality of appointments in the calendar of the driver, transmitting, by the one or more computing devices, the route for the driver to the mobile device, receiving, from the mobile device, a request to add a new destination to the route for the driver, modifying, by the one or more computing devices, the route to include the new destination, resulting in a modified route comprising the new destination, and transmitting, by the one or more computing devices, the modified route for the driver to the mobile device.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited, by the accompanying figures in which like reference numerals indicate similar elements and in which.

DETAILED DESCRIPTION

In accordance with various aspects of the disclosure, computerized methods, systems, devices, and apparatuses are disclosed that provide an intuitive route selection system for determining routes with multiple stops for drivers. In particular, the route selection system may integrate calendar information, telematics information, driving behaviors, driving risks, road safety, traffic conditions, and driver preferences to provide drivers with customized navigation to various destinations or locations corresponding to appointments, meetings, or other events in a driver's calendar. In some cases, the route selection system may be referred to as a multi-stop route selection tool or a multi-stop route selection manager as described herein.

The present disclosure teaches a route selection system that may be beneficial for allowing drivers to engage safely with navigation services on their mobile devices through a route selection mobile application while driving. The route selection system may be integrated across a plurality of platforms and may be deployed by an insurance provider that offers navigation services and benefits to drivers (e.g., insurance policy holders). That is, the insurance provider may offer route selection services or benefits to drivers who are insurance policy holders with registered accounts, wherein the drivers may have opted in for the route selection program. In some cases, the insurance provider may offer limited route selection services to drivers without registered accounts (e.g., non-customers) as a way of incentivizing the drivers to become insurance policy holders.

In particular, the route selection system may collect driving data from a telematics device in a driver's vehicle and/or from the driver's mobile device. For example, a mobile application may be installed on the driver's mobile device in order to monitor driving data using one or more sensors of the mobile device. The driving data may include real-time data that is collected by one or more sensors (e.g., accelerometer, GPS, gyroscope, and the like) while the driver is driving, such as the driver's speeds, accelerations, braking, GPS coordinates, the vehicle location, and the like. Based on the collected driving data, the route selection system may determine driving behaviors of the driver. For example, driving behaviors may be based on a driver's speed, acceleration, braking, steering, turn signals, number of miles driven for a trip, amount of time driven or trip duration, road condition ratings, and the like.

Additionally, the route selection system may interface with a driver's mobile device to provide customized navigation based on the driver's calendar or tasks list. For example, the route selection system may receive data regarding a calendar of the driver from the driver's mobile device. In some embodiments, the route selection system may access the driver's calendar and parse the data to identify locations and times for each appointment in the driver's calendar. For example, the driver may have a calendar application on his or her mobile application with a schedule of appointments, including times and locations of each appointment. The calendar may include descriptions and addresses for each scheduled appointment in the driver's calendar.

Appointments in the driver's calendar may include any meetings or appointments, such as meetings at work (e.g., team meetings, conference calls, video or teleconferences, etc.), lunch appointments, doctors' appointments, parent-teacher meetings, and the like. Appointments in the driver's calendar may also include reminders regarding holidays or important dates for the driver to remember, such as birthdays, anniversaries, and the like. Appointments in the driver's calendar may further include any errands or tasks in the driver's calendar. For example, a driver may schedule times in his or her calendar as reminders to attend different events or perform various tasks, such as picking up food for dinner on his or her way home from work, picking up dry-cleaning, dropping off and/or picking up his or her kids (e.g., at or from school, a soccer game, dance recital, band practice, and the like), taking his or her vehicle to a repair shop or car dealership for maintenance (e.g., oil changes, tire rotations, car repairs, etc.) and the like. In some embodiments, some of the errands or tasks in the driver's calendar might not be scheduled for a specific time and may be performed at any time at which the driver is available.

The route selection system may identify each of the appointments (e.g., meetings, errands, and/or tasks) in the driver's calendar and determine a customized route comprising multiple destinations for the driver based on the vehicle location, the one or more driving behaviors of the driver, and the plurality of appointments in the driver's calendar. For example, the multiple destinations in the route may correspond to the locations for each appointment in the driver's calendar. In order to determine the route, the route selection system may analyze a driving history of the driver to calculate an average length of time it takes the driver to reach the location for each appointment in the calendar of the driver. For example, the driver may frequently travel to certain locations (e.g., work, home, school, doctor's office, or the like), and the route selection system may be able to keep track of these locations and the amount of time that it takes for the driver to typically reach these locations. The route selection system may determine the customized route comprising the multiple destinations based on the time of each appointment in the driver's calendar and the average length of time it takes the driver to reach the location for each appointment.

In additional embodiments, the route selection system may also identify errands or tasks that are unscheduled or not assigned to a specific time in the driver's calendar. For example, the driver may need to pick up dry-cleaning or go shopping, but these tasks might not be scheduled such as a doctors' appointment or a work meeting, and may be of lower priority to the driver. Thus, the route selection system may identify locations corresponding to these tasks and determine whether these locations can be included in the route comprising the multiple destinations. In other words, the route selection system may be able to identify and assign priority levels to the multiple appointments in the driver's calendar and navigate the driver to the appointments with the higher priority levels first.

The route selection system may also determine the route further based on at least one of risk scores, road safety, traffic, and weather. For example, certain routes may have a higher risk score than other routes because of the number of accidents that occur on the roads or dangerous intersections with a greater number of collisions than other intersections. In another example, some roads, such as two-way country roads, bridges, highways, and the like, may be more dangerous than others to drive on during hazardous weather conditions (e.g., heavy rain, thunderstorms, thick fog, ice, sleet, wind, flooding, etc.). Thus, the route selection system may account for weather conditions, traffic, and road safety and optimize the route for the driver accordingly. In some cases, the route selection system may communicate with application program interfaces (APIs), data analytics platforms, and/or third-party platforms that provide weather information, traffic information, road safety information, risk information, and/or the like. Risk information may include risk values for road segments, and the route selection system may determine and select less risky travel routes to drive during storms or dangerous weather conditions.

Upon determining the route for the driver, the route selection system may transmit the route to the mobile device of the driver. In some cases, the driver may either accept the route or request to modify the route according to his or her preferences. For example, the driver may have a preference to take a different route to avoid tollways and/or highways or to take a different route to avoid flooding on certain streets. Thus, the driver may wish to modify the route accordingly. In other cases, the driver may have a new destination to add to the multi-stop route obtained from the route selection system. For example, the calendar of the driver may receive an electronic invitation for a new meeting or appointment, and the driver may wish to update the multi-stop route to include the location of the new meeting or appointment. In particular, the calendar application may receive an electronic invitation for a new appointment over a network (e.g., Internet) from a server, such as an email server, and may automatically add the new appointment to the driver's calendar. Thus, the driver may submit a request, from his or her mobile device to the route selection system, to add a new destination for the new appointment to the route. In another example, the calendar application installed on the driver's mobile device may automatically transmit a request to the route selection system to add the new destination to the route.

The route selection system may receive the request to add a new destination to the route and may modify the route to include the new destination, resulting in a modified route comprising the new destination. In some embodiments, the route selection system may modify the route by identifying priority levels of the multiple destinations in the route for the driver. For example, each destination in the route may correspond to an appointment in the driver's calendar, in which each appointment may be marked as a different priority level. Priority levels of the plurality of appointments in the driver's calendar may be indicated by a predetermined color scheme, by a numeric scale, or by levels corresponding to low, medium, and high priority. In some embodiments, the priority levels of the plurality of appointments in the driver's calendar may be established by the route selection system, a user, or both. The route selection system may identify the priority levels of the plurality of appointments in the driver's calendar and assign priority levels to each destination in a multi-stop route, in which the priority levels for each destination correspond to the priority levels for each appointment.

The route selection system may then assign a priority level to the new destination based on the corresponding invitation added to the calendar for the new appointment. For example, the priority level may be based on the time of the new appointment or based on the priority level with which the invitation was transmitted (e.g., by an email server). The route selection system may prioritize the multiple destinations in the route and the new destination according to the order of the assigned priority levels. In some embodiments, the route selection system may identify that the priority level of the new destination has a value that is higher than the priority levels of the multiple destinations in the route. Thus, the route selection system may generate a modified route comprising navigation to the new destination prior to navigation to each of the multiple destinations. In other embodiments, the route selection system may generate a modified route with navigation to the new destination for the new appointment after the other appointments in the driver's calendar. After generation of the modified route, the route selection system may then transmit the modified route for the driver to the mobile device. Ultimately, the route selection system may use priority levels in navigating to various appointments in the driver's calendar in order to provide the driver with an optimal route that is customized according to the driver's preferences and driving behaviors.

In additional embodiments, the route selection system may also be able to interface with a driver's mobile device in order to capture vehicle information, identify maintenance recommendations, and provide customized navigation to repair shops and/or service centers for maintenance issues. For example, the route selection system may generate a command directing a route selection server to access a camera installed on a driver's mobile device in order to allow the driver to scan or photograph a vehicle identification number (VIN) barcode for the driver's vehicle. The mobile device may then transmit data regarding the VIN barcode for the driver's vehicle to the route selection server and/or route selection system. Based on the VIN barcode, the route selection system may identify a make, model, and/or year of the driver's vehicle and identify maintenance recommendations that are specific to the particular vehicle (e.g., maintenance recommendations that are provided by a manufacturer of the particular type of vehicle). The route selection system may integrate the maintenance recommendations into a multi-stop route for the driver. For example, based on the maintenance recommendations, the route selection system may determine that a driver's vehicle needs an oil change and may prompt the driver (e.g., through a mobile application on his or her mobile device) with multiple options of oil change stations that are on the driver's current route. In some cases, the route selection system may modify the driver's route based on the priority levels of appointments in the driver's calendar, as well as based on the priority level and urgency of the recommended maintenance.

Furthermore, the route selection system may also include back-end servers and subsystems for a route selection mobile application that may be installed on a driver's mobile device. The route selection mobile application may provide one or more user interfaces (e.g., displayed on a screen of the mobile device) including a virtual dashboard that displays the driver's vehicle information, maintenance recommendations, tips, offers, and other information based on a VIN barcode of the driver's vehicle with dynamic graphic elements. By integrating a driver's calendar, traffic information, vehicle information, maintenance information, maps, and other services with driving behavior and telematics information, the route selection system may enhance user experiences while driving and provide navigation to drivers on the road through a virtual dashboard in a safe, efficient, and dynamic manner.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is also noted that these connections are general and, unless specified otherwise, may be direct or indirect, wired or wireless, and that the specification is not intended to be limiting in this respect.

Figure 1:
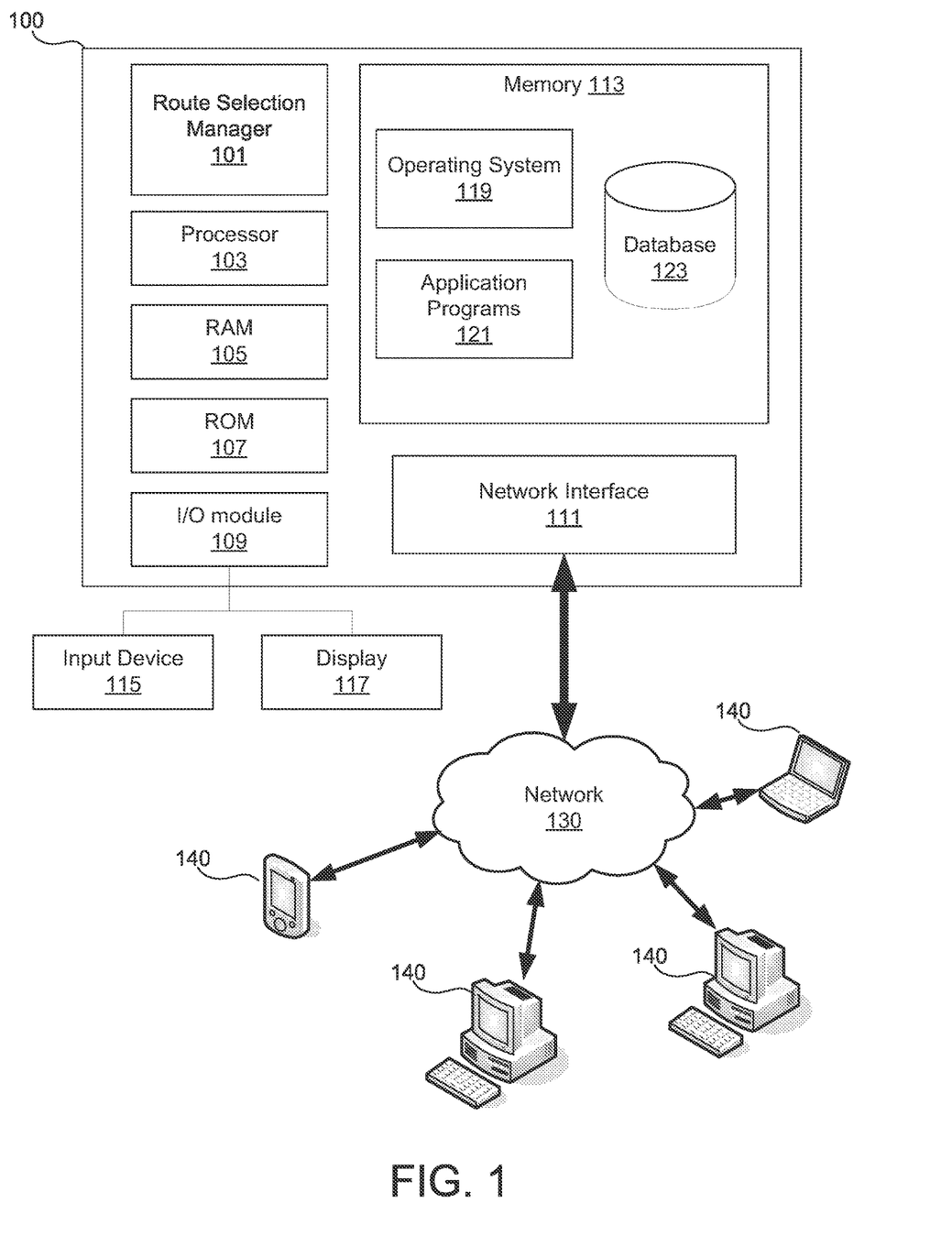
FIG. 1 depicts a block diagram of an example route selection device that may be used in accordance with one or more example embodiments.

In one or more arrangements, teachings of the present disclosure may be implemented with a computing device. FIG. 1 illustrates a block diagram of an example route selection device 100 that may be used in accordance with aspects of the present disclosure. The route selection device 100 is a specialized computing device programmed and/or configured to perform and carry out aspects associated with providing route selection features to drivers as described herein. The route selection device 100 may have a route selection manager 101 configured to perform methods and execute instructions as described herein. The route selection manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the route selection manager 101 may refer to the software (e.g., a computer program or application) and/or hardware used to receive driving data for drivers and current vehicle locations, determine driving behaviors for each driver based on the driving data, receive data regarding a calendar of each driver, identify a plurality of appointments in the calendar of each driver, determine a route comprising multiple destinations for each driver based on vehicle location, the one or more driving behaviors of each driver, and the plurality of appointments in the calendar of each driver, transmit the route for each driver to a mobile device of each driver, receive a request to add one or more new destinations to the route for each driver, modify the route to include the one or more new destinations, and transmit the modified route for each driver to the mobile device of each driver. Specifically, the route selection manager 101 may be a part of a route selection system that assesses driving behavior data, a current vehicle location, and calendar information and determines an optimized multi-stop route that is transmitted to a driver's mobile device. The one or more specially configured processors of the route selection manager 101 may operate in addition to or in conjunction with another general processor 103 of the route selection device 100. In some embodiments, the route selection manager 101 may be a software module executed by one or more general processors 103. Both the route selection manager 101 and the general processor 103 may be capable of controlling operations of the route selection device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or a driver associated with the route selection device 100 may provide input data. The I/O module 109 may also be configured to be connected to a display device 117, such as a monitor, television, touchscreen, and the like, and may include a graphics card. The display device 117 and input device 115 are shown as separate elements from the route selection device 100, however, they may be within the same structure.

Using the input device 115, system administrators may update various aspects of the route selection system, such as rules, predefined threshold values, predetermined ranges, and/or information related to parsing data regarding drivers' calendars in order to identify one or more appointments, appointment locations, and appointment times for drivers, analyzing a driving history for each driver to determine average lengths of time it takes the driver to reach a location for each appointment in the calendar, determining routes comprising multiple destinations for each driver based on appointment times, appointment locations, and the average lengths of time, assigning priority levels for each destination in the route, and generating modified routes comprising navigation to new destinations with higher priority levels prior to navigation to destinations with lower priority levels. On some route selection devices 100, the input device 115 may be operated by users (e.g., drivers each associated with at least one vehicle) to interact with the route selection system, including receiving or submitting information regarding vehicle locations, traffic information, driving behaviors, calendar and/or task information, scheduled appointments, requesting to modify routes, providing or updating preferences for route selection services, updating account information, and the like, as described herein. In some embodiments, the input device 115 may include a microphone that allows drivers to verify or submit information by speech inputs and interact with the route selection system. Additionally or alternatively, the display device 117 may allow drivers to confirm or view their inputs.

The memory 113 may be any computer readable medium for storing computer executable instructions (e.g., software). The instructions stored within memory 113 may enable the route selection device 100 to perform various functions. For example, memory 113 may store software used by the route selection device 100, such as an operating system 119 and application programs 121, and may include an associated database 123.

The network interface 111 allows the route selection device 100 to connect to and communicate with a network 130. The network 130 may be any type of network, including a local area network (LAN) and/or a wide area network (WAN), such as the Internet. Through the network 130, the route selection device 100 may communicate with one or more computing devices 140, such as laptops, notebooks, smartphones, personal computers, servers, and the like. The computing devices 140 may include at least some of the same components as route selection device 100. In some embodiments the route selection device 100 may be connected to the computing devices 140 to form a "cloud" computing environment.

The network interface 111 may connect to the network 130 via communication lines, such as coaxial cable, fiber optic cable, and the like or wirelessly using a cellular backhaul or a wireless standard, such as IEEE 802.11, IEEE 802.15, IEEE 802.16, and the like. In some embodiments, the network interface may include a modem. Further, the network interface 111 may use various protocols, including TCP/IP, Ethernet, File Transfer Protocol (FTP), Hypertext Transfer Protocol (HTTP), and the like, to communicate with other computing devices 140.

FIG. 1 is an example embodiment of a route selection device 100. In other embodiments, the route selection device 100 may include fewer or more elements. For example, the route selection device 100 may use the general processor(s) 103 to perform functions of the route selection manager 101, and thus, might not include a separate processor or hardware for the route selection manager 101. Additionally, or alternatively, the route selection device 100 may be a mobile device (e.g., a smartphone, tablet, and the like) specially configured to perform or carry out aspects of route selection services described herein, and thus, may also include various other components, such as a battery, speaker, and/or antennas (not shown). Also, the route selection device 100 may be a telematics device and/or a vehicle computing device (either installed by a vehicle manufacturer or as an aftermarket part) having vehicle compatible elements, such as a port for an on-board diagnostic connector or ports for other vehicle sensors (e.g., fuel level sensors, tire pressure sensors, engine temperature sensors, and the like). For example, the route selection device 100 may be a vehicle's computer or a device plugged into the vehicle's computer for use in vehicle telematics.

Figure 2:
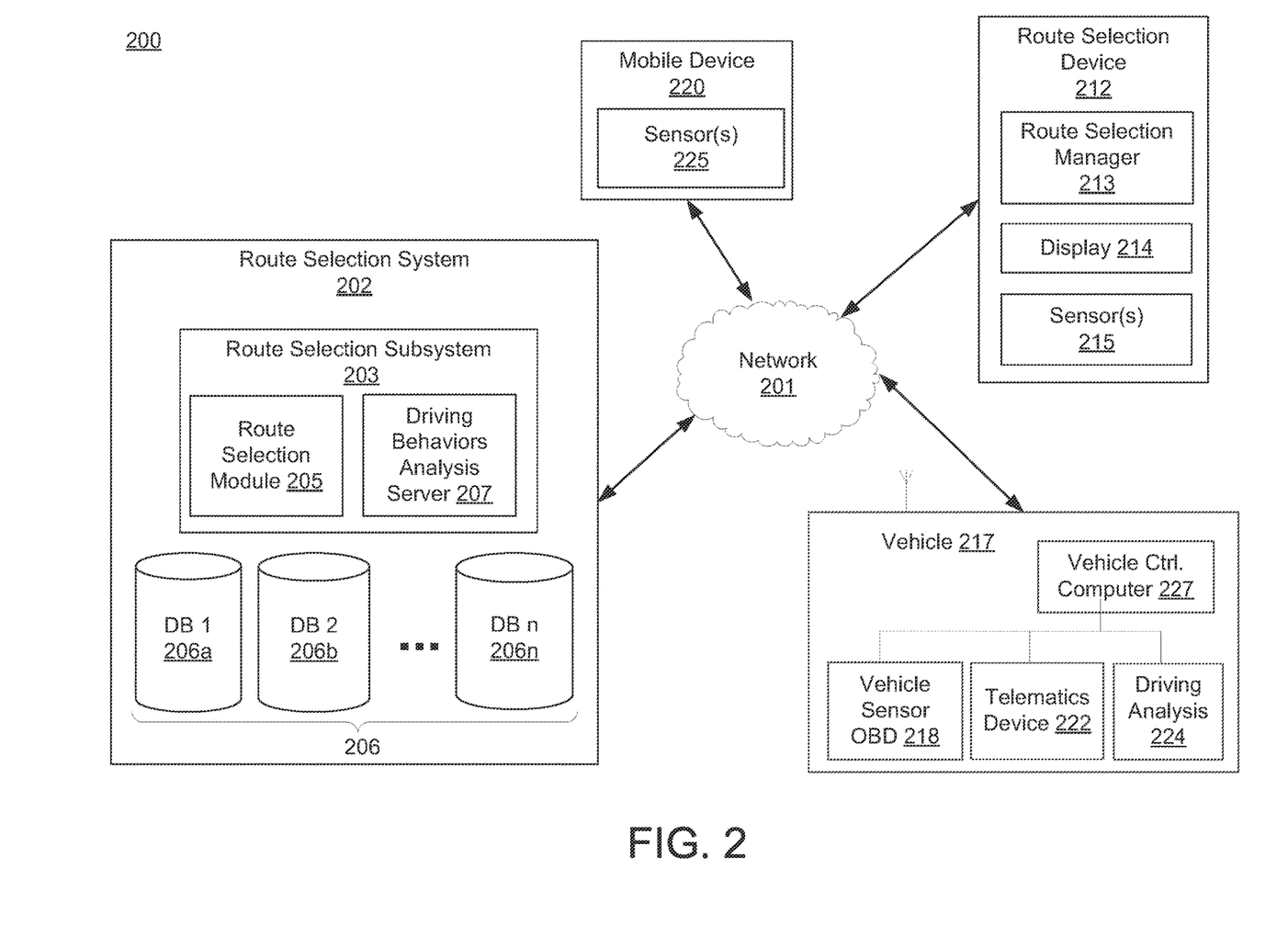
FIG. 2 depicts an example network environment in which various aspects of the present disclosure may be implemented in accordance with one or more example embodiments.

The computerized methods for providing route selection features in order to enhance each user's driving experience as disclosed herein may be implemented on one or more route selection devices 100 used in various network environments. FIG. 2 illustrates an example network environment 200 for implementing methods in accordance with aspects of the present disclosure.

As shown in FIG. 2, the network environment 200 may include a network 201 configured to connect a route selection system 202, route selection device 212, vehicle 217, and mobile device 220. The route selection device 212 may be the same as or at least similar to the route selection device 100 described above with reference to FIG. 1. Collectively, these specialized computing devices may form at least a part of a route selection system. Although only one of each of the components 212, 217, and 220 are shown in FIG. 2, it is understood that there may be any number of components 212, 217, and 220 in the network environment 200.

The network 201 may be any type of network, like the network 130 described above, and may use one or more communication protocols (e.g., protocols for the Internet (IP), Bluetooth, cellular communications, satellite communications, and the like.) to connect computing devices and servers within the network environment 200 so they may send and receive communications between each other. In particular, the network 201 may include a cellular network and its components, such as cell towers. Accordingly, for example, a mobile device 220 (e.g., a smartphone, flip-phone, tablet, and the like) or a route selection device 212 of a driver associated with vehicle 217 may communicate, via a cellular backhaul of the network 201, with a route selection system 202 to request to participate in route selection services or features. For example, the mobile device 220 or route selection device 212 may request for the route selection system 202 to provide optimized navigation services to a driver based on identifying appointments in the driver's calendar. In some cases, the request to provide optimized navigation services may be performed automatically by the mobile device 220 or the route selection device 212 upon receiving telematics data from the vehicle 217. For example, the mobile device 220 or route selection device 212 may identify that a driver is operating the vehicle 217 and driving to a certain destination (e.g., recognized based on receiving telematics data from the vehicle 217), and the mobile device 220 or route selection device 212 may automatically parse the driver's calendar to identify any upcoming appointments for the driver. In another example, the mobile device 220 or the route selection device 212 of the driver of the vehicle 217 may communicate, via the cellular backhaul of the network 201, with the route selection system 202 to submit information regarding modify the driver's calendar, schedule, and/or tasks or information to update account information and/or preferences for the route selection services for the vehicle 217.

And in the opposite direction, the route selection system 202 may communicate, via the cellular backhaul of the network 201, with the mobile device 220 or the route selection device 212 to notify the user (e.g., the driver of vehicle 217) of the mobile device 220 or route selection device 212 of one or more appointments and/or tasks in the driver's calendar and notify the user of a customized multi-stop route determined based on the location of the vehicle 217, the one or more driving behaviors of the driver, and the plurality of appointments in the calendar of the driver. The route selection system 202 may also communicate, via the cellular backhaul of the network 201, with the mobile device 220 or the route selection device 212 to receive updated calendar information and to transmit modified multi-stop routes to users at the mobile device 220 or the route selection device 212.

In some embodiments, appointments may include any meetings, teleconferences, errands, tasks, or reminders in a driver's calendar. Appointments may be scheduled or unscheduled and may be assigned different priority levels. In some cases, for each appointment, a driver may need to drive to various locations to perform different tasks and/or attend meetings; thus, the driver may schedule one or more times in his or her calendar as reminders on the mobile device 220 or the route selection device 212. In another embodiment, the mobile device 220 and/or route selection device 212 may communicate back and forth with the route selection system 202 over the Internet, such as through a web portal. As shown in FIG. 2, it should be understood that the mobile device 220 or route selection device 212 may connect to the network even if it is removed from the vehicle 217.

In an embodiment, there may be multiple vehicles 217 that are covered by an insurance policy of one individual, wherein the individual may be signed up for route selection services for each of his or her vehicles 217. Although FIG. 2 illustrates only one vehicle 217, the route selection system may be configured to communicate with multiple vehicles 217 simultaneously (e.g., at or around the same time), and the multiple vehicles 217 may be associated with multiple individuals. The route selection system 202 may receive driving data and current vehicle locations for respective drivers of multiple vehicles simultaneously, determine driving behaviors based on the driving data for respective drivers simultaneously, receive data regarding calendars for respective drivers simultaneously, identify a plurality of appointments in the calendars for respective drivers simultaneously, determine routes comprising multiple destinations for each respective driver simultaneously based on vehicle location, the one or more driving behaviors of each respective driver, and the plurality of appointments in the calendar of each respective driver, notify the respective drivers of the generated routes simultaneously, receive requests to modify or update the routes for each respective driver simultaneously, modify the routes to include one or more new destinations for each respective driver simultaneously, and notify the respective drivers of the modified routes simultaneously. The multiple vehicles 217 may be any type of vehicle, including a car, motorcycle, bicycle, scooter, drone (or other automated device), truck, bus, boat, plane, helicopter, and the like, wherein the multiple vehicles 217 may be the same or may vary.

In an embodiment, there may be a driver associated with the vehicle 217. The driver may be associated with the vehicle 217 if the driver is an owner of the vehicle 217 and/or has access and/or permission to drive or operate the vehicle 217. Additionally or alternatively, a driver may be associated with the vehicle 217 if the driver is identified on an insurance policy that insures the vehicle 217. A driver of the vehicle 217 may interact with and operate a route selection device 212. In an embodiment, the route selection device 212 may be a specialized mobile device (e.g., mobile phone), a tablet, laptop, personal computer, and the like configured to perform or carry out aspects associated with route selection services as described herein. For example, the route selection device 212 may be the same (e.g., integrated with, include substantially the same components and provide substantially the same functionality, or the like) as the mobile device 220 depicted in FIG. 2. The route selection device 212 may belong to a driver, individual, or customer of an insurance company who is enrolled in the route selection program. In some cases, the route selection device 212 may be at an insurance provider, and data may be transmitted between the driver and the device 212. Although only one route selection device 212 is illustrated in FIG. 2, there may be any number of route selection devices 212, wherein each route selection device 212 is associated with at least one driver. The route selection device 212 may further comprise a route selection manager 213, a display 214, and sensors 215. In the case of a route selection device 212 that is installed in or connected to a vehicle 217 (e.g., an on-board vehicle computing device), the individual is considered to operate that route selection device 212 by performing the installation or connection of that device in or at the vehicle 217. In some embodiments, the route selection device 212 may be connected with a speaker system in the vehicle 217, so that the driver may be able to hear audio from the route selection device 212 through the speakers in the vehicle 217.

The route selection device 212 may be configured to execute the route selection manager 213 that presents a user interface (e.g., a graphical user interface for a website, application, software program, and the like) on the display 214. The display 214 may comprise a monitor, television, touchscreen, and the like. The user interface of the route selection manager 213 may allow drivers to send and receive information regarding, vehicle locations, traffic information, weather information, risk information, road safety information, driving behaviors, calendar and/or task information, appointment information, and/or customized route information. Drivers may also employ the user interface of the route selection manager 213 to request to modify or update a customized route provided by the route selection system 202, and to and update account information or preferences for route selection provided by the route selection system 202.

The route selection manager 213 may be a self-sufficient program or may be a module, plug-in, or add-on of another program, such as a program used to collect and/or evaluate driver information representing actions of a vehicle 217, driving behavior of a driver associated with a vehicle 217, and/or status updates of a vehicle 217. The route selection manager 213 may have access to driving behavior data that is collected by the sensors 215 of the route selection device 212. The route selection manager 213 may be configured in a similar manner as the route selection manager 101 or configured to perform similar functions as those performed by the route selection manager 101. The sensors 215 may comprise various sensors and/or modules that detect driving data, vehicle location, environmental information, and/or other related factors of a driver of a vehicle 217. For example, the sensors 215 may comprise an accelerometer, speedometer, GPS, gyroscope, camera (or other image sensor), audio sensor, pressure sensor, and the like. The route selection manager 213 may also have access to vehicle information (e.g., a vehicle identification number (VIN), make, model, and/or year of a vehicle of a driver), driving data, and/or other information that is collected by the sensors 215 of the route selection device 212. For example, the sensors 215 may include fuel level sensors, tire pressure sensors, car engine sensors, oxygen sensors, temperature sensors, water sensors, coolant sensors, position sensors, oil pressure gauges and the like. Each of these sensors 215 may be used to monitor various metrics of the vehicle 217 to ensure that the vehicle 217 is properly functioning under safe operating conditions.

In an embodiment, the route selection manager 213 may be downloaded or otherwise installed onto the route selection device 212 using known methods. Different devices may install different versions of the route selection manager 213 depending on their platform. A driver may launch the route selection manager 213 by, for example, operating buttons or a touchscreen on the route selection device 212 or by speech or a voice input. Additionally, or alternatively, the route selection device 212 may be configured to execute a web browser (e.g., an application for accessing and navigating the Internet) to access a web page providing an interface for the route selection system. In some embodiments, the route selection device 212 may also be configured to collect information, such as driving data. For example, the route selection manager 213 or another program installed on the route selection device 212 may instruct the route selection device 212 to collect driving data in or near real-time using the various sensors 215 and/or vehicle sensors 218 (e.g., accelerometer, speedometer, GPS, gyroscope, magnetometer, car engine sensors, oxygen sensors, temperature sensors, water sensors, coolant sensors, position sensors, oil pressure gauges, and the like). Driving data may include real-time data regarding a driver's speed, acceleration, braking, steering, turn signals, and the like. The route selection manager 213 may determine driving behavior data based on the driving data. For example, drivers may exhibit different driving behaviors, such as staying within or going above posted speed limits or engaging in or avoiding sudden braking or sharp turning events while driving vehicle 217. Different driving behaviors may affect how quickly (and/or how slowly) a driver will reach a destination in his or her vehicle 217. This information may be used to predict when a vehicle will arrive at a location for an appointment in the driver's calendar.

The route selection manager 213 or another program may also collect location information, such as GPS coordinates indicating the geographical location of the route selection device 212 and/or vehicle 217. In some embodiments, based on the collected driving behavior data and location information, the route selection manager 213 may recognize that the driver is driving to a certain destination based on the route that the driver is taking. For example, the route selection manager 213 may keep track of locations to which the driver has previously traveled over a period of time (e.g., in the past two days, week, 30 days, two months, or another period of time) and maintain this information as driving history data (which may be stored in a database 206). The route selection manager 213 may further store an amount of time that it takes the driver to reach each location and calculate an average length of time (e.g., 10 minutes, 30 minutes, one hour, or any other length of time) that it takes for the driver to reach each particular location.

Additionally, the route selection manager 213 may access a calendar of the driver, wherein the calendar may be a part of the route selection manager 213 or a feature from a different application on the route selection device 213. The route selection manager 213 may access the calendar and parse data to identify meetings, appointments, and/or tasks for the driver, along with corresponding locations and times. In some cases, the calendar may include descriptions and addresses for each meeting, appointment, and/or task for the driver.

Appointments may include any work meetings, lunch appointments, doctors' appointments, parent-teacher meetings, or any other appointments or tasks that a driver may add to his or her calendar. For example, a driver may schedule time for tasks or errands (e.g., which may be referred to as a scheduled meeting), such as picking up food for dinner on the way home, picking up dry-cleaning dropping off and/or picking kids, taking the driver's vehicle to the repair shop or car dealership for maintenance, and the like. In some embodiments, some of the errands or tasks in the driver's calendar might not be scheduled for a specific time and may be performed at any time at which the driver is available. The route selection manager 213 or another program installed on the route selection device 212 may collect driving data over a predetermined period of time, determine driving behaviors and a current vehicle location, parse data regarding the driver's calendar, and determine multi-stop routes with multiple destinations for the driver based on the driving behaviors, the current vehicle location, and the plurality of appointments in the driver's calendar, in which each destination corresponds to a respective appointment.

For example, the route selection manager 213 may identify the location and time of each appointment in the driver's calendar and may analyze the driving history of the driver to determine an average length of time it takes for the driver to reach the location for each appointment in the calendar of the driver. Based on the time for each appointment and the average length of time it takes the driver to reach the location for each appointment, the route selection manager 213 may determine an optimized multi-stop route for the driver. In some embodiments, route selection manager 213 may calculate how long it will take for the driver in vehicle 217 to arrive at a location for an appointment based on the driver's current location, the driver's previous and current speeds, the distance between the current location and the meeting location, the amount of traffic in the driver's route, weather conditions, number of traffic signals on the driver's route, speed limits on the driver's routes, and the like. Based on this calculated length of time, the route selection manager 213 may optimize the navigation route to include a route with less traffic or a route that the driver prefers in order to assist the driver in getting to his or her appointment in a timely manner.

In some embodiments, the route selection manager 213 may identify errands or tasks that are unscheduled or not assigned to a specific time in the driver's calendar. The route selection manager 213 may identify locations corresponding to these tasks and determine whether these locations can be included in the route comprising destinations for the multiple appointments in the driver's calendar. In other words, the route selection manager 213 may be able to identify and assign priority levels to the multiple appointments in the driver's calendar and navigate the driver to the appointments with the higher priority levels first.

In additional embodiments, the route selection manager 213 may also determine a multi-stop route further based on at least one of risk scores, road safety, traffic, and weather. For example, certain routes may have a higher risk score than other routes because of the number of accidents that occur on the roads or dangerous intersections with a greater number of collisions than other intersections. In another example, some roads, such as two-way country roads, bridges, highways, and the like, may be more dangerous than others to drive on during hazardous weather conditions (e.g., heavy rain, thunderstorms, thick fog, ice, sleet, wind, flooding, etc.). Thus, the route selection manager 213 may account for weather conditions, traffic, and road safety and optimize the route for the driver accordingly. In some cases, the route selection manager 213 may communicate with application program interfaces (APIs) that provide weather information, traffic information, road safety information, risk information, and the like. Risk information may include risk values for road segments, and the route selection system may determine and select less risky travel routes to drive during storms or dangerous weather conditions.

After determining a route for a driver, the route selection manager 213 may generate a route for the driver that is outputted on the display 214 of the route selection device 212 or transmitted to the driver at his or her mobile device 220. The driver may either accept the route or request to modify the route according to his or her preferences. For example, the driver may have a preference to take a different route to avoid certain roads (e.g., toll roads, highways, roadways susceptible to flooding, etc.). Thus, the driver may wish to modify the route accordingly. In other embodiments, the driver may have a new destination to add to the multi-stop route obtained from the route selection manager 213. For example, the driver may need to cancel or reschedule an appointment in his or calendar due to a change in his or her schedule, and may wish to modify the multi-stop route to reflect the change made to his or her schedule. In another example, the calendar of the driver may receive an electronic invitation for a new meeting or appointment, and the driver may wish to update the multi-stop route to include the location of the new meeting or appointment. In particular, the calendar may be an application installed on the route selection device 212 or the mobile device 220, and the calendar application may receive an electronic invitation for a new appointment over the network 201 from a server, such as an email server. The calendar application may automatically add the new appointment to the driver's calendar. Thus, the driver may submit a request to the route selection system 202, from his or her mobile device 220 or from the route selection device 212, to add a new destination for the new appointment to the route. In another example, the calendar application installed on the driver's mobile device 220 or route selection device 212 may automatically transmit a request to the route selection system 202 to add the new destination to the route.

The route selection system 202 may receive the request to add a new destination to the route from the mobile device 220 or the route selection device 212, and may modify the route by identifying priority levels of the multiple destinations in the route for the driver. For example, each destination in the route may correspond to an appointment in the driver's calendar, in which each appointment may be marked as a different priority level. Priority levels of the plurality of appointments in the driver's calendar may be indicated by a predetermined color scheme, by a numeric scale, or by levels corresponding to low, medium, and high priority. The route selection system 202 may identify the priority levels of the plurality of appointments in the driver's calendar and assign priority levels to each destination in a multi-stop route, in which the priority levels for each destination correspond to the priority levels for each appointment.

The route selection system 202 may then assign a priority level to the new destination based on the corresponding invitation added to the calendar for the new appointment. For example, the priority level may be based on the time of the new appointment or based on the priority level with which the invitation was transmitted (e.g., by an email server). The route selection system 202 may prioritize the multiple destinations in the route and the new destination according to the order of the assigned priority levels. In some embodiments, the route selection system 202 may identify that the priority level of the new destination has a value that is higher than the priority levels of the multiple destinations in the route. Thus, the route selection system 202 may generate a modified route comprising navigation to the new destination prior to navigation to each of the multiple destinations. In other embodiments, the route selection system 202 may generate a modified route with navigation to the new destination for the new appointment after the other appointments in the driver's calendar. After generation of the modified route, the route selection system 202 may then transmit the modified route for the driver to the mobile device 220 or the route selection device 212.

Based on the driver's preferences, the route selection manager 213 may automatically determine routes for the driver as described herein or send requests to the driver to confirm whether the driver would like to proceed with an optimized multi-stop route generated by the route selection manager 213. The driver associated with the vehicle 217 and associated with the route selection device 212 may employ the route selection manager 213 to send, receive, confirm, and/or access at least one of calendar information, scheduled meeting information (e.g., including meeting locations and meeting times), estimated arrival times, driving behavior information, account information, and settings/preferences related to the vehicle 217.

As illustrated in FIG. 2, vehicle 217 also includes vehicle operation sensor 218 (similar to one or more sensors 215) capable of detecting and recording various conditions at the vehicle and operational parameters of the vehicle. For example, sensor 218 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 218 also may detect and store data received from the vehicle's 217 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 218 may detect and store the external driving conditions, for example, external temperature, rain, snow, light levels, and sun position for driver visibility. For example, external cameras and proximity sensors 218 may detect other nearby vehicles, vehicle spacing, traffic levels, road conditions, traffic obstructions, animals, cyclists, pedestrians, and other conditions that may factor into a driving data/behavior analysis. Sensor 218 also may detect and store data relating to moving violations and the observance of traffic signals and signs by the vehicle 217. Additional sensors 218 may detect and store data relating to the maintenance of the vehicle 217, such as the engine status, oil level, engine coolant temperature, odometer reading, the level of fuel in the fuel tank, engine revolutions per minute (RPMs), software upgrades, and/or tire pressure.

Vehicle sensor 218 also may include cameras and/or proximity sensors capable of recording additional conditions inside or outside of the vehicle 217. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 218 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 217. Sensor 218 also may be configured to collect data relating to a driver's movements or the condition of a driver. For example, vehicle 217 may include sensors that monitor a driver's movements, such as the driver's eye position and/or head position, etc. Additional sensors 218 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 218 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 218 may determine when and how often the vehicle 217 stays in a single lane or strays into other lane. A Global Positioning System (GPS), locational sensors positioned inside the vehicle 217, and/or locational sensors or devices external to the vehicle 217 may be used to determine the route, speed, lane position, road-type (e.g. highway, entrance/exit ramp, residential area, etc.) and other vehicle position/location data.

The data collected by vehicle sensor 218 (e.g., driving behavior data) may be stored and/or analyzed within the vehicle 217, such as for example by a driving analysis computer 224 integrated into the vehicle, and/or may be transmitted to one or more external devices. For example, as shown in FIG. 2, sensor data may be transmitted via a telematics device 222 to one or more remote computing devices, such as route selection device 212, mobile device 220, route selection system 202, and/or other remote devices.

As shown in FIG. 2, the data collected by vehicle sensor 218 may be transmitted to a route selection system 202, route selection device 212, mobile device 220, and/or additional external servers and devices via telematics device 222. Telematics device 222 may be one or more computing devices containing many or all of the hardware/software components as the route selection manager 101 depicted in FIG. 1. The telematics device 222 may receive vehicle operation data and driving data from vehicle sensor 218, and may transmit the data to one or more external computer systems (e.g., route selection system 202, insurance system server of an insurance company, financial institution, or other entity) over a wireless transmission network. Telematics device 222 also may be configured to detect or determine additional types of data relating to real-time driving and the condition of the vehicle 217. The telematics device 217 also may store the type of vehicle 217, for example, the make, model, trim (or sub-model), year, and/or engine specifications, as well as other information such as vehicle owner or driver information, insurance information, and financing information for the vehicle 217.

In some cases, the telematics device 222 may be a device that is plugged into the vehicle's 217 on-board diagnostic (OBD) system (e.g., plugged in through an OBD II connector) or otherwise installed in the vehicle 217 in order to collect data. The telematics device 222 may also collect GPS coordinates, such as through its own GPS receiver. In the example shown in FIG. 2, the telematics device 222 may receive vehicle driving behavior data from vehicle sensor 218, and may transmit the data to a route selection system 202. As mentioned above, this driving behavior data may include data indicative of one or more vehicle metrics or vehicle telematics data, such as based on a driver's speed, acceleration, braking, steering, turn signals, and the like. In other examples, one or more of the vehicle sensors 218 or systems may be configured to receive and transmit data directly from or to a route selection system 202 without using a telematics device. For instance, telematics device 222 may be configured to receive and transmit data from certain vehicle sensors 218 or systems, while other sensors or systems may be configured to directly receive and/or transmit data to a route selection system 202 without using the telematics device 222. Thus, telematics device 222 may be optional in certain embodiments.

In some embodiments, telematics device 222 may be configured to execute a route selection manager 213 that presents a user interface for a driver and/or user to provide inputs to and receive outputs from the route selection system 202. The route selection manager 213 may be downloaded or otherwise installed onto the telematics device 222 using known methods. Once installed onto the telematics device 222, a driver may launch the route selection manager 213 by, for example, operating buttons or a touchscreen on the dashboard of the vehicle 217 or by speech or a voice input. Additionally, or alternatively, the telematics device 222 may be configured to execute a web browser to access a web page providing an interface for the route selection system 202.

FIG. 2 also illustrates a mobile device 220 which may be any mobile device associated with a driver of vehicle 217. In particular, the mobile device 220 may belong to a driver of the vehicle 217, wherein the driver is a customer of an insurance company and enrolled in a program that allows the driver to participate in route selection. Mobile device 220 may be, for example, a smartphone or other mobile phone, personal digital assistant (PDA), tablet computer, and the like, and may include some or all of the elements described above with respect to the route selection manager 101. As shown in this example, some mobile devices (e.g., mobile device 220) may be configured to establish communication sessions with vehicle-based devices and various internal components of vehicle 217 via wireless networks or wired connections (e.g., for docked devices), whereby such mobile devices 220 may have secure access to internal vehicle sensors 218 and other vehicle-based systems.

However, in other examples, the mobile device 220 might not connect to vehicle-based computing devices and internal components, but may operate independently by communicating with vehicle 217 via their standard communication interfaces (e.g., telematics device 222, etc.), or might not connect at all to vehicle 217. In some cases, the mobile device 220 may be configured similarly to the route selection device 212 and may interface or communicate with the telematics device 222 via a wired connection (e.g., USB, OBD II connector, and the like) or a wireless connection (e.g., Bluetooth). In some embodiments, both telematics device 222 and mobile device 220 (or a route selection device 212) may be employed, whereas in another embodiment, only one of these devices may be used with the route selection system to collect driving behavior data and vehicle locations. For example, a driver associated with the vehicle 217 may choose whether he or she wishes to use his or her mobile phone to capture driving data or whether he or she wishes to have a device plugged into the vehicle 217 to collect driving behavior data.

FIG. 2 also illustrates example subsystems within the network environment 200. That is, the route selection system 202 may comprise a route selection subsystem 203 and a plurality of databases 206. The route selection subsystem 203 may include one or more application servers, computing devices, and other equipment (e.g., conference bridge equipment) used by company (e.g., insurance provider) personnel to implement and provide the route selection described herein. For example, the route selection subsystem 203 may include a route selection module 205 that is configured with programmed instructions to receive driving data for drivers and current vehicle locations from the telematics device 222, determine driving behaviors for each driver based on the driving data, receive data regarding a calendar of each driver from the route selection device 212 or the mobile device 220, identify a plurality of appointments in the calendar of each driver, determine a route comprising multiple destinations for each driver based on vehicle location, the one or more driving behaviors of each driver, and the plurality of appointments in the calendar of each driver, transmit the route for each driver to the mobile device 220 or route selection device 212 of each driver, receive a request from the mobile device 220 or route selection device 212 to add one or more new destinations to the route for each driver, modify the route to include the one or more new destinations, and transmit the modified route for each driver to the mobile device 220 or route selection device 212 of each driver.

The route selection module 205 may determine multi-stop routes for drivers and store data regarding the routes as one or more records in a database (e.g., database 206) of the route selection system 202, in which the one or more records may be associated with driver or customer records stored in the database. For example, the one or more records may identify a unique identification number for a driver or customer. In one example, a mobile device may be associated with the driver through the use of a unique identification number (e.g., a phone number) for the driver. In another example, the one or more records may include multiple fields for insurance ratings, including premium level, deductible level, amounts, and the like. The route selection module 205 may update or adjust a route for a driver by inserting one or more identifiers in the fields of the one or more records. In another example, the route selection module 205 may also store and/or access data regarding a driver's calendar information (e.g., including information regarding appointments in the driver's calendar) and driving behavior data as one or more records in a database (e.g., database 206). The one or more records regarding appointments in the driver's calendar may include a field for a description of each appointment, a field for the appointment location, a field for the appointment time, and the like. The route selection module may update the appointment description, the appointment location, and/or the appointment time by inserting one or more identifiers in the fields of the one or more records.

Furthermore, the route selection module 205 may also update or store information regarding driving data, driving behaviors, driving history, calendar information, and the like in one or more databases 206. For example one or more databases 206 may store driving data that is collected by sensors 215 of the route selection device 215, sensors 225 of the mobile device 220, or by vehicle sensors 218. The one or more databases 206 may also store calendar information for each driver. The calendar information may include a schedule of one or more appointments, meetings, tasks, reminders, and the like, including descriptions, addresses (e.g., corresponding to each location of the meeting), and times for each appointment in the driver's calendar.

The route selection subsystem 203 may include functionality that may be distributed among a plurality of computing devices. For example, the route selection subsystem 203 may comprise further subsystems, including client-side subsystems and server-side subsystems. The client-side subsystem may interface with the route selection device 212, telematics device 222, and/or mobile device 220, whereas the server-side subsystem may interface with application servers and computing devices which handle a variety of tasks related to receiving driving data and a vehicle location, identifying driving behaviors based on driving data, identifying appointments in a driver's calendar, determining multi-stop routes with multiple destinations based on the vehicle location, driving behaviors, and appointments in the driver's calendar, transmitting multi-stop routes to drivers, modifying multi-stop routes to include new destinations, and transmitted modified multi-stop routes to drivers. For example, the subsystem 203 may also include one or more servers, such as a driving behaviors analysis server 207. The driving behaviors analysis server 207 may be configured to perform aspects of determining driving behaviors from collected driving data as described herein. For example, the driving behaviors analysis server 207 may analyze collected driving data for a driver of the vehicle 217, identify one or more driving behaviors, determine routes for a driver based on the one or more driving behaviors, and/or provide notifications of the routes to the driver of vehicle 217.

The subsystems, application servers, and computing devices of the route selection subsystem 203 may also have access to the plurality of databases 206. In some embodiments, the plurality of databases 206 may be incorporated into the route selection subsystem 203 or may be separate components in the route selection subsystem 203. As an example, the plurality of databases 206 (e.g., databases 206a-206n) may comprise an accounts and billing database, a driving behaviors database, a calendar information database, and other databases. One or more of the databases 206a-206n may comprise information regarding at least one of driving behavior data, vehicle information, calendar information including appointment times and locations, estimated arrival times, route selection information, driver preferences, and account and billing information. For example, databases 206a-206n may store one or more records of driving history, such as previous locations at which the driver has had appointments, previous driving behaviors, driving patterns, and the like. The data stored in the plurality of databases 206 may be collected and compiled by the route selection device 212, the telematics device 222, the route selection subsystem 203, or by servers and subsystems within the route selection subsystem 203.

In some embodiments, the route selection module 205 may access calendar information stored in one or more databases 206 to identify one or more tasks that were not previously completed or appointments that were canceled. For example, a driver might not have been able to complete a task, such as grocery shopping, or keep an appointment, such as a doctor's appointment or a nail salon appointment, on a certain day because of a busy work day or a change in his or her schedule. Thus, the route selection module 205 may transmit, to the mobile device 220 or route selection device 212, one or more notifications or reminders regarding the uncompleted tasks and/or canceled appointments. The route selection module 205 may also identify times in the driver's calendar at which the driver may be available to complete the remaining tasks or times in the driver's calendar at which the driver may be available for rescheduling a previously canceled appointment. The route selection module 205 may further identify locations of appointments that are already scheduled in the driver's calendar and locations corresponding to the uncompleted tasks or canceled appointments, and determine whether the driver will have time to drive to the locations corresponding to the uncompleted tasks and/or canceled appointments in between appointments that are already scheduled in the driver's calendar. Thus, the route selection module 205 may be able to generate and transmit to the driver an optimized route navigating the driver from a location of a scheduled appointment to another location corresponding to an uncompleted task or canceled appointment.

Additionally, the route selection module 205 may also access calendar information and identify conflicts in the driver's schedule based on appointment times, driving behaviors, traffic conditions, weather conditions, and the like. For example, a driver may have a first appointment at 8 AM in a first city, and a second appointment at 9 AM in a second city that is located 10, 20, or any other number of miles away from the first city. Based on current traffic conditions and driving behaviors of the driver, the route selection module 205 may determine that the driver will not be able to make it to the second appointment on time, and may transmit an alert to the driver's mobile device 220 or route selection device 212 to notify the driver to reschedule the second appointment. In another example, a driver may have accidentally scheduled two appointments at the same time, the route selection module 205 may parse data regarding the calendar to identify another time and day at which the driver may reschedule one of appointments.

Additionally or alternatively, the route selection module 205 may also be able to prioritize scheduled appointments for a driver. For example, the route selection module 205 may be able to prioritize assigned priority levels to the multiple appointments in the driver's calendar and navigate the driver to the appointments with the higher priority levels first. In some cases, the route selection module 205 may be able to prioritize appointments based on the driver's preferences. That is, the driver may set preferences for the route selection module 205 to prioritize certain meetings, appointments, and/or tasks over others in his or her calendar. For example, the driver may wish to prioritize appointments, such as picking up his or her kids from school or doctor's appointments over work meetings, or vice versa. In some embodiments, the driver may indicate these preferences using the route selection manager 213 on the route selection device 212. By prioritizing scheduled meetings for drivers based on calendars, email inbox, and/or driver preferences, the route selection system 202 may provide drivers with additional functionality to enhance the navigation services.

Figure 3:
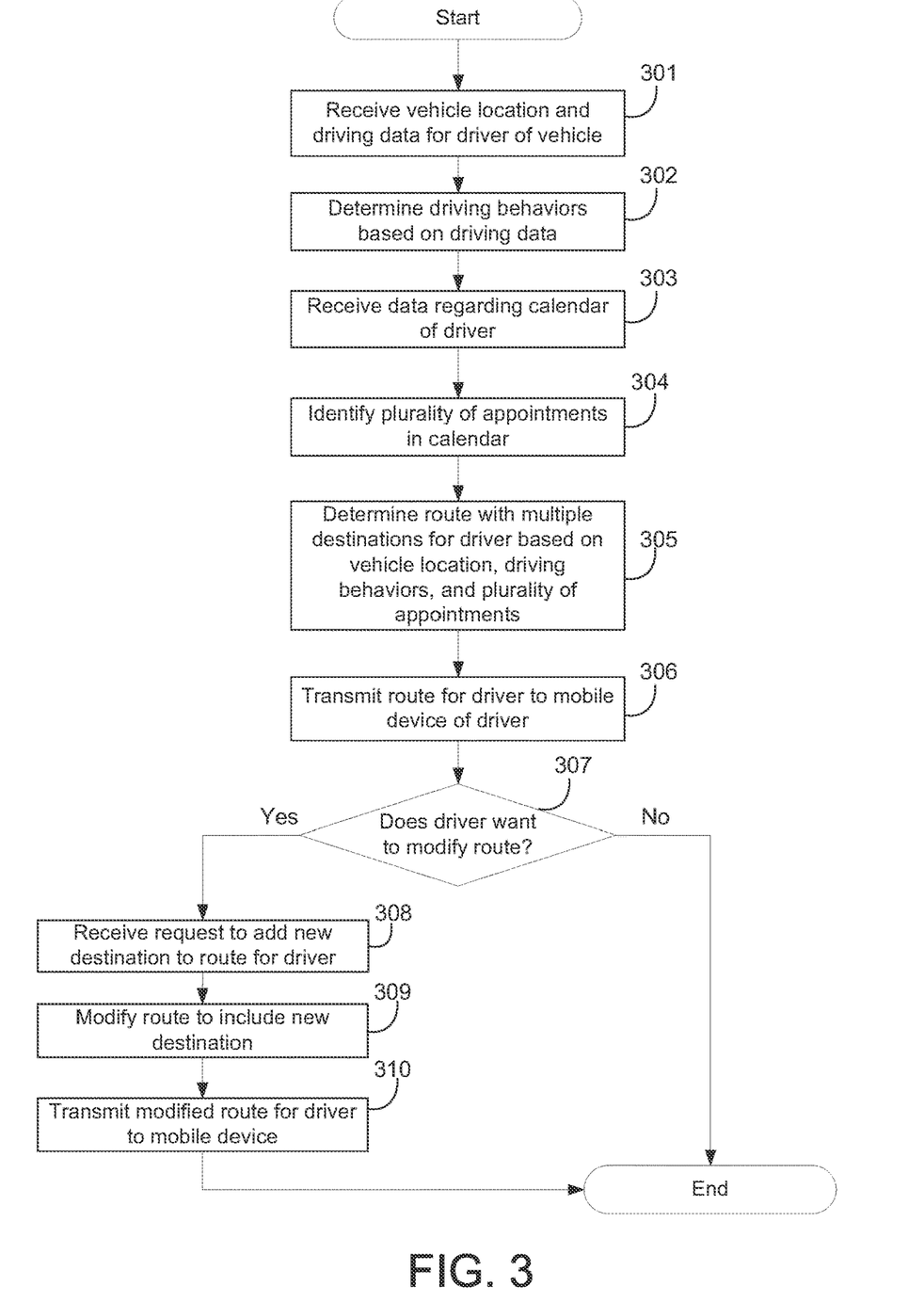
FIG. 3 depicts a flow diagram of example method steps in accordance with one or more example embodiments.

FIG. 3 illustrates a flow diagram of an example method in accordance with aspects of the present disclosure. In particular, FIG. 3 illustrates example method steps for receiving driving data, a vehicle location, and data regarding a driver's calendar, determining driving behaviors, identifying a plurality of appointments in the driver's calendar, determining a multi-stop route based on the vehicle location, driving behaviors, and the plurality of appointments, transmitting the multi-stop route to the driver, modifying the multi-stop route based on input from the driver, and transmitting the modified multi-stop route to the driver. The steps of FIG. 3 may be performed by subsystems, application servers, and computing devices of the route selection system 202 (e.g., route selection subsystem 203). One or more of the steps of FIG. 3 may be performed by executing a route selection program (e.g., a route selection mobile application) and/or by operating a particularly configured computing device of the route selection system 202.

The method of FIG. 3 may begin with a step 301 of receiving driving data for a driver and a vehicle location. For example, the route selection system 202 may receive driving data for a driver of the vehicle 217, along with the current location of the vehicle 217, and the time corresponding to the current location of the vehicle 217. In some embodiments, the driving data of the vehicle 217 may be collected over a period of time by the telematics device 222, route selection device 212, or mobile device 220. Driving data may include real-time data that is collected by vehicle sensors 218, sensors 215 of the route selection device 215, or sensors 225 of the mobile device 220, and the real-time data may include at least one of a driving speed, an acceleration measurement, a braking measurement, a steering measurement, a number of miles driven for a trip, a road condition rating, or a trip duration. The current location of the vehicle 217 may include GPS data indicating the present location of the vehicle 217, along with a time and date of when the GPS data was obtained (e.g., the time at which the vehicle 217 was at the specific location).

At step 302, the route selection system may determine driving behaviors based on the driving data. For example, the route selection system 202 may identify one or more patterns in the one or more vehicle metrics or vehicle telematics data, such as a number of speeding events, sharp turns, hard braking events, unsafe or safe steering, number of turn signals, and the like. At step 303, the route selection system may receive data regarding a calendar of the driver. For example, the route selection system 202 may receive data regarding a driver's calendar from the mobile device 220 or the route selection device 212. In another example, the route selection system 202 may access a calendar application installed on the mobile device 220 or the route selection device 212 of the driver and obtain calendar data through the calendar application. In yet another example, the route selection system 202 may access data regarding the driver's calendar from a database (e.g., database 206) storing calendar information for the driver.

At step 304, the route selection system may identify a plurality of appointments in the driver's calendar. For example, the route selection system 202 may parse data regarding the calendar of the driver in order to identify a plurality of appointments in the driver's calendar, along with a location and time for each appointment. At step 305, the route selection system may determine a route with multiple destinations for the driver based on the vehicle location, one or more driving behaviors, and the plurality of appointments. For example, the route selection system 202 may determine a multi-stop route comprising turn by turn directions navigating the user to each destination corresponding to each appointment in the driver's calendar. In some cases, the route selection system 202 may determine a customized multi-stop route comprising the multiple destinations further based on the time of each appointment in the driver's calendar and the average length of time it takes the driver to reach the destination for each appointment.

At step 306, the route selection system may transmit the route with the multiple destinations to a device corresponding to the driver. For example, the route selection system 202 may transmit the route, including navigation to the multiple destinations for the appointments in the driver's calendar, to the driver's mobile device 220 or the route selection device 212 corresponding to the driver. At step 307, the route selection system may determine whether or not the driver desires to modify the route. For example, the route selection system 202 may transmit the route with the multiple destinations to the driver, and the driver may either accept or modify the route by providing user input through the mobile device 220 or the route selection device 212. If the driver accepts the route (e.g., by providing user input through the mobile device 220 or the route selection device 212 to the route selection system 202) and does not desire to modify the route, then the method in this example is completed, and the driver may use the route provided by the route selection system 202 to drive to the multiple appointments in his or her calendar.

However, if the driver does not accept the route (e.g., by providing user input through the mobile device 220 or the route selection device 212 to the route selection system 202) and desires to modify the route, then the method in this example proceeds to step 308. At step 308, the route selection system may receive a request to add a new destination to the route for the driver. For example, the route selection system 202 may receive a request transmitted from the driver's mobile device 220 or the route selection device 212 to add a new destination to the route based on a new appointment for the driver. At step 309, the route selection system may modify the route to include the new destination. For example, the route selection system 202 may modify the route to include the new destination by identifying priority levels of the multiple destinations in the route for the driver, assigning a new priority level to the new destination, and modifying the route based on the priority levels of the multiple destinations and the new destination. At step 310, the route selection system may transmit the modified route for the driver to a device corresponding to the driver. For example, the route selection system 202 may transmit the modified route, including navigation to the new destination along with the multiple destinations for the appointments in the driver's calendar, to the driver's mobile device 220 or the route selection device 212 corresponding to the driver.

Figure 4:
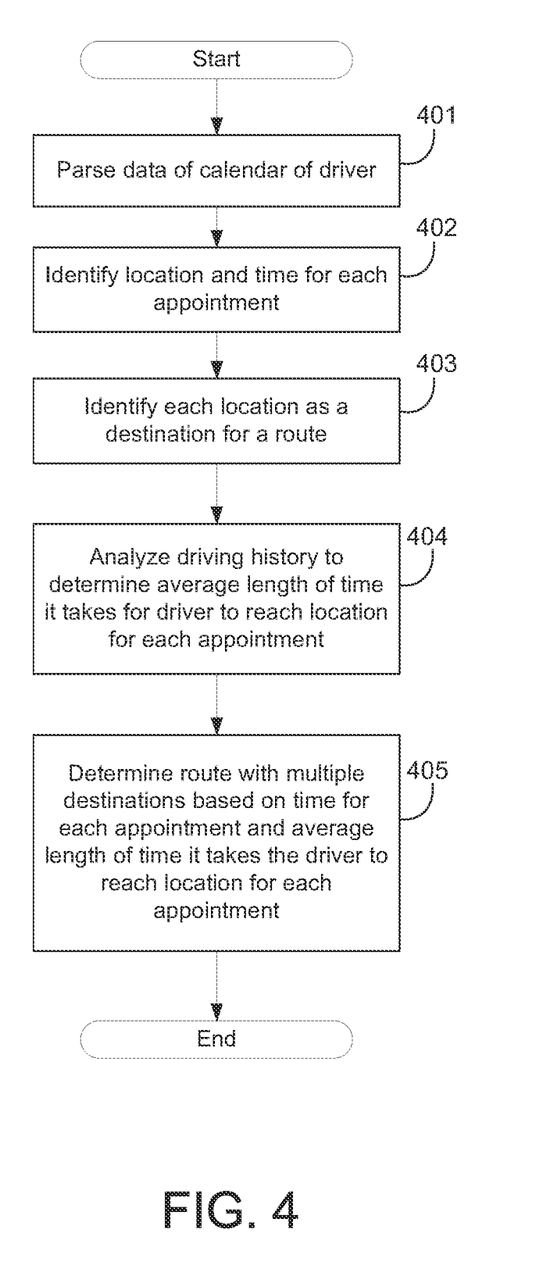
FIG. 4 depicts a flow diagram of example method steps in accordance with one or more example embodiments.

FIG. 4 illustrates a flow diagram of an example method in accordance with aspects of the present disclosure. In particular, FIG. 4 illustrates example method steps for parsing data regarding a driver's calendar, identifying locations and times of each appointment in the driver's calendar, identifying each location as a destination for a route, analyzing driving history to determine average length of time it takes the driver to reach the location for each appointment in the driver's calendar, and determining a route with multiple destinations based on the time of each appointment and the average length of time it takes the driver to reach the location for each appointment in the driver's calendar. The steps of FIG. 4 may be performed by subsystems, application servers, and computing devices of the route selection system 202 (e.g., route selection subsystem 203). One or more of the steps of FIG. 4 may be performed by executing a route selection program (e.g., a route selection mobile application) and/or by operating a particularly configured computing device of the route selection system 202.

The method of FIG. 4 may begin with a step 401 of parsing data regarding a calendar of a driver. For example, the route selection system 202 may parse data regarding a calendar of the driver in order to identify a plurality of appointments for the driver. In some cases, the route selection system 202 may access a calendar application installed on the mobile device 220 or the route selection device 212 of the driver and parse the calendar data through the calendar application. In yet another example, the route selection system 202 may access and parse data regarding the driver's calendar from a database (e.g., database 206) storing calendar information for the driver.

At step 402, the route selection system may identify the location and time for each appointment in a plurality of appointments in the driver's calendar. For example, the route selection system 202 may identify an address for an appointment or task and the time of each appointment based on parsing the calendar data. At step 403, the route selection system may identify each location as a destination for a multi-stop route for the driver. For example, the route selection system 202 may identify several locations for the plurality of appointments and may categorize each location to correspond to a destination for a multi-stop route for the driver.

At step 404, the route selection system may analyze the driving history of the driver to determine an average length of time it takes for the driver to reach the location for each appointment. For example, the route selection system 202 may access driving history data of the driver stored in a database (e.g., database 206), in which the driving history data may indicate data regarding the locations to which the driver has previously traveled over a period of time (e.g., in the past day, two days, week, 30 days, two months, or another period of time) and the amounts of time that it took the driver to reach each of the locations. The route selection system 202 may analyze the driving history data to calculate an average length of time (e.g., 10 minutes, 30 minutes, one hour, or any other length of time) that it takes for the driver to reach each particular location corresponding to the multiple appointments in the driver's calendar.

At step 405, the route selection system may determine a route with multiple destinations based on the time of each appointment and the average length of time it takes the driver to reach the location for each appointment. For example, the route selection system 202 may determine an optimized multi-stop route for the driver based on the time of each appointment and the average length of time it takes the driver to reach the location for each appointment.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system for generating an updated route based on an unscheduled task, the system comprising:
   one or more processors; and
   a non-transitory computer-readable medium storing instructions that, when executed by the one or more processors, cause the one or more processors to:
      determine one or more driving behaviors of a driver of a vehicle based on received telematics data captured by one or more telematics sensors on a client device associated with a user;
      determine, based on a vehicle computing device having vehicle compatible elements for obtaining diagnostics of vehicle sensor data captured from one or more sensors on the vehicle, a vehicle maintenance recommendation, wherein an associated priority level is based on an urgency determined by the vehicle sensor data;

identify one or more scheduled event locations associated with the user based on remote calendar data, wherein each scheduled event location is assigned an associated priority level and an associated time period;

determine a route comprising the one or more scheduled event locations based on the associated priority level and the associated time period;

determine an unscheduled task location for an unscheduled task associated with the vehicle maintenance recommendation with an unscheduled task time can be added to the route to generate an updated route, wherein the updated route reaches each scheduled event location before the associated time period;

modify, based on the unscheduled task location, the remote calendar data associated with a third-party calendar application to include the unscheduled task at the unscheduled task time and the unscheduled task location; and send navigational directions readable by a navigational application for the updated route on the client device.

2. The system of claim 1, wherein the instructions further cause the one or more processors to:

determine risk scores associated with different route options between each of the one or more scheduled event locations and a previous location and a next location of the route, wherein the risk scores are calculated based on historical and real-time data associated with respective routes; and select the updated route based on the updated route being one of the different route options associated with a lowest risk score.

3. The system of claim 1, wherein the instructions further cause the one or more processors to:

determine the associated priority level based on a received priority level from a third-party server in association with an invitation for a scheduled event.

4. The system of claim 1, wherein a priority level of the vehicle maintenance recommendation is used to determine where along the route to add the unscheduled task.

5. The system of claim 1, wherein the unscheduled task is based on a canceled appointment.

6. The system of claim 1, wherein the instructions further cause the one or more processors to:

determine, based on real-time data, that the updated route would result in a conflict in a later scheduled event; and send new navigational directions readable by the navigational application for the route that removes a stop.

7. A computer-implemented method for generating an updated route based on an unscheduled task, the computer-implemented method comprising:

determining one or more driving behaviors of a driver of a vehicle based on received telematics data captured by one or more telematics sensors on a client device associated with a user;

determining, based on a vehicle computing device having vehicle compatible elements for obtaining diagnostics of vehicle sensor data captured from one or more sensors on the vehicle, a vehicle maintenance recommendation, wherein an associated priority level is based on an urgency determined by the vehicle sensor data;

identifying one or more scheduled event locations associated with the user based on remote calendar data, wherein each scheduled event location is assigned an associated priority level and an associated time period;

determining a route comprising the one or more scheduled event locations based on the associated priority level and the associated time period;

determining an unscheduled task location for an unscheduled task associated with the vehicle maintenance recommendation with an unscheduled task time can be added to the route to generate an updated route, wherein the updated route reaches each scheduled event location before the respective associated time period;

modifying, based on the unscheduled task location, the remote calendar data associated with a third-party calendar application to include the unscheduled task at the unscheduled task time and the unscheduled task location; and sending navigational directions readable by a navigational application for the updated route on the client device.

8. The computer-implemented method of claim 7, further comprising:

determining risk scores associated with different route options between each of one or more scheduled event locations and a previous location and a next location of the route, wherein the risk scores are calculated based on historical and real-time data associated with respective routes; and selecting the updated route based on the updated route being one of the different route options associated with a lowest risk score.

9. The computer-implemented method of claim 7, further comprising:

determining the associated priority level based on a received priority level from a third-party server in association with an invitation for a scheduled event.

10. The computer-implemented method of claim 7, wherein a priority level of the vehicle maintenance recommendation is used to determine where along the route to add the unscheduled task.

11. The computer-implemented method of claim 7, wherein the unscheduled task is based on a canceled appointment.

12. The computer-implemented method of claim 7, wherein the computer-implemented method further comprising:

determining, based on real-time data, that the updated route would result in a conflict in a later scheduled event; and sending new navigational directions readable by the navigational application for the route that removes a stop.

13. A non-transitory computer readable medium comprising instructions, the instructions, when executed by a computing system, cause the computing system to:

determine one or more driving behaviors of a driver of a vehicle based on received telematics data captured by one or more telematics sensors on a client device associated with a user;

determine, based on a vehicle computing device having vehicle compatible elements for obtaining diagnostics of vehicle sensor data captured from one or more sensors on the vehicle, a vehicle maintenance recommendation, wherein an associated priority level is based on an urgency determined by the vehicle sensor data;

identify one or more scheduled event locations associated with the user based on remote calendar data, wherein each scheduled event location is assigned an associated priority level and an associated time period;

determine a route comprising the one or more scheduled event locations based on the associated priority level and the associated time period;

determine an unscheduled task location for an unscheduled task associated with the vehicle maintenance recommendation with an unscheduled task time can be added to the route to generate an updated route, wherein the updated route reaches each scheduled event location before the associated time period;

modify, based on the unscheduled task location, the remote calendar data associated with a third-party calendar application to include the unscheduled task at the unscheduled task time and the unscheduled task location; and send navigational directions readable by a navigational application for the updated route on the client device.

14. The non-transitory computer readable medium of claim 13, wherein the instructions further cause the computing system to:

determine risk scores associated with different route options between each of the one or more scheduled event locations and a previous location and a next location of the route, wherein the risk scores are calculated based on historical and real-time data associated with respective routes; and select the updated route based on the updated route being one of the different route options associated with a lowest risk score.

15. The non-transitory computer readable medium of claim 13, wherein the instructions further cause the computing system to:

determine the associated priority level based on a received priority level from a third-party server in association with an invitation for a scheduled event.

16. The non-transitory computer readable medium of claim 13, wherein a priority level of the vehicle maintenance recommendation is used to determine where along the route to add the unscheduled task.

17. The non-transitory computer readable medium of claim 13, wherein the unscheduled task is based on a canceled appointment.

* * * * *